United States Patent
Báder

(10) Patent No.: US 8,781,463 B2
(45) Date of Patent: Jul. 15, 2014

(54) METHOD OF AND AN OPERATING SUPPORT SYSTEM FOR PROVIDING PERFORMANCE MANAGEMENT IN A MOBILE TELECOMMUNICATIONS SYSTEM

(75) Inventor: Attila Báder, Paty (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 169 days.

(21) Appl. No.: 13/509,077

(22) PCT Filed: Dec. 10, 2009

(86) PCT No.: PCT/EP2009/066806

§ 371 (c)(1), (2), (4) Date: Sep. 4, 2012

(87) PCT Pub. No.: WO2011/069546

PCT Pub. Date: Jun. 16, 2011

(65) Prior Publication Data

US 2012/0322438 A1 Dec. 20, 2012

(51) Int. Cl.
*H04W 24/00* (2009.01)

(52) U.S. Cl.
USPC ..... 455/424; 455/423; 455/422.1; 455/67.11; 709/224

(58) Field of Classification Search
CPC .. H04W 24/00; H04W 88/02; H04B 17/0042; H04L 9/08072
USPC ............. 455/424, 423, 422.1, 67.11; 709/224
See application file for complete search history.

(56) References Cited

U.S. PATENT DOCUMENTS

| | | |
|---|---|---|
| 2003/0064720 A1 | 4/2003 | Valins et al. |
| 2005/0260982 A1* | 11/2005 | Ko et al. .................... 455/423 |
| 2006/0274703 A1 | 12/2006 | Connelly |
| 2008/0004035 A1* | 1/2008 | Atkins et al. ................ 455/454 |
| 2008/0188188 A1* | 8/2008 | Malomsoky et al. ........ 455/90.2 |
| 2009/0047977 A1* | 2/2009 | Malomsoky et al. ...... 455/456.1 |
| 2009/0075648 A1* | 3/2009 | Reed et al. .................... 455/424 |
| 2010/0070624 A1* | 3/2010 | Lee .............................. 709/224 |

FOREIGN PATENT DOCUMENTS

EP          0961439 A2     12/1999

* cited by examiner

*Primary Examiner* — Danh Le
(74) *Attorney, Agent, or Firm* — Coats and Bennett P.L.L.C

(57) ABSTRACT

A method of and an Operating Support System, OSS, system (20) for Performance Management, PM, of a mobile telecommunications system (1) comprising a plurality of nodes (6) and radio access units (5) servicing a plurality of cells (15) generating a plurality of operational events data (13) and counter values (14) measured periodically for a first Result Output Period, ROP. Events data (13) and counter values (14) originating from the nodes (6) and radio access units (5) are collected (21; 40), aggregated (23; 41) periodically for a second and further ROPs having a duration longer than the first ROP. From the collected events data (13) further counter values are created (22, 42) periodically for the second and further ROPs. The aggregated and further counter values are processed (24; 43) corresponding to the originating nodes (6), radio access units (5) and ROP, and the processed counter values are analyzed (24; 44) for providing system operational performance indicia in different time scales.

14 Claims, 4 Drawing Sheets

METHOD OF AND AN OPERATING SUPPORT SYSTEM FOR PROVIDING PERFORMANCE MANAGEMENT IN A MOBILE TELECOMMUNICATIONS SYSTEM

TECHNICAL FIELD

The present invention relates to telecommunications and, in particular, to performance management in mobile telecommunications systems for monitoring and optimising system operation.

BACKGROUND

Performance Management, PM, functions in a mobile telecommunications system are used for monitoring, trouble shooting and optimisation of the mobile telecommunications system. The PM functions are based on events and counters generated by the several system elements of the mobile telecommunications system, among which radio access units or Base Stations, BS, radio network controllers and other system nodes and servers.

Events are used to monitor and investigate the elementary system operation. Relevant information of the operation of the system can be obtained from a long time observation of the events data.

Counters are used to obtain aggregate or statistical information of the system. Counters are implemented in the various system elements but can also be created from events and event parameters. There is a continuously increasing number of predefined counters that are recorded in the system elements.

Examples for the recording of events are the General Performance Event handler, GPEH, and User Equipment Traffic Recording, UETR, functions of system elements. An example for collecting statistical counters is the STATS function of system elements in, for example, third generation, 3G, and Long Term Evolution, LTE, mobile telecommunications systems. Note that events data and counter values generated by a plurality of system elements may be collected by a common server or gateway instead of by the system elements themselves.

The events data and counter values may be forwarded directly, in real-time, to a management server or gateway, which is part of an Operating Support System, OSS, by using a streaming application, for example. However, the events and counters may also be collected in files for a set period of time, called the Result Output Period, ROP, before forwarding thereof to the OSS. ROP files are retrieved periodically from the system elements and processed in the OSS. Both, real-time events data and counter values as well as ROP files may be available for processing by the OSS.

An OSS implements several types of PM functions such as traffic monitoring, trouble-shooting, radio and transport network optimisation. From the processed events and counters Key Performance Indicators, KPIs, can be driven that are used for monitoring, trouble shooting and planning purposes. KPIs are used for high level monitoring and business planning functions. These functions are not necessarily part of the OSS.

An OSS may also include applications for user defined counters to be created from events or event combinations, which provides an extended observation possibility for telecommunications systems. Besides the above, the events data and counter values may be used by other applications as well.

LTE networks, for example, implement a lot of auto-configuration functions and use default configurations which provide fast installation and stable operation in the initial phase of a systems setup. However, monitoring of the overall operation of the large number of system elements requires a centralized management system. Exceptional conditions and operations should be observed by a performance monitoring OSS. Performance monitoring tools and functions are also needed in order to optimise the operation of LTE.

A problem of LTE performance monitoring is the plural numbers of nodes and cells, i.e. femto cells, that have to be monitored. These nodes, also called LTE eNodeB, generate larger numbers of events and counters that have to be processed compared to previous mobile Radio Access Network, RAN, systems, such as GSM RAN, for example.

Scalability issues occur if the OSS has to communicate and collect events data and counter values directly for large numbers of system elements, such as the LTE eNodeBs. In particular in the absence of (intermediate) control nodes, which are also used for collecting and pre-processing PM data from the system elements in GSM and WCDMA RAN systems.

Another problem with newly deployed systems and system technology is the lack of reference data for the different parameters, to derive KPIs, for example. Current PM monitoring functions need a lot of prior knowledge of the system, or decent operational experience, which means more expensive implementations and increased operating expenses. This is in particular a problem for small system operators which are not able to invest in the implementation of such tools and do not have large experienced staff for evaluation and system operation.

SUMMARY

It is an object of the present invention to provide performance management functions for a mobile telecommunications system that can be implemented in a central operating support system or as a separate performance management tool, and adapted to collect and process plural events data and counter values generated by plural system elements.

It is another object of the present invention to provide an expert tool for automatically extracting monitoring, trouble shooting and optimisation information from the performance management functions of the mobile telecommunications system, for use by a systems operator.

A first aspect comprises a method of system Performance Management, PM, by an Operating Support System, OSS, of a mobile telecommunications system. The mobile telecommunications system comprising a plurality of nodes and radio access units servicing a plurality of cells generating a plurality of operational events data and counter values measured periodically for a first Result Output Period, ROP. The method comprising the steps of:

collecting events data and counter values originating from the nodes and radio access units;
  aggregating the collected counter values periodically for a second and further ROPs having a duration longer than the first ROP, wherein the first and second and further ROPs are set corresponding to a specific operational event and counter;
  creating further counter values from the collected events data periodically for the second and further ROPs;
  processing the aggregated and further counter values corresponding to the originating nodes, radio access units and ROP, and
  analysing the processed counter values for providing system operational performance indicia in different time scales.

The aggregation of counter values for a second and further result output periods, i.e. for a second, third, fourth, etc. result output period, provides scalability and adequate time based statistics for the counters. For adequately identifying problems that occur on different time scales, the aggregation periods are set corresponding to specific events and counters. That is, events and counters that relate to short term problems are aggregated for a correspondingly short result output period and events and counters that relate to long term problems are aggregated for a correspondingly long result output period, for example. Note that some events and counters should be observed and aggregated both in short and long time periods.

Events data, which may include different parameters, are turned into further counter values that are not provided for by the counter values that are directly collected from the system elements, i.e. the nodes and radio access units of the mobile communications system. By creating such further counters for specific events periodically, corresponding to a respective set aggregation period or time scale for the specific events, self-consistency of the performance data available as events and counters in the system is maintained such that the aggregated and further counter values may be commonly processed in relation to the different system elements for providing performance management information in accordance with the time scale relevant for the specific information.

In this manner, larger numbers of events data and counter values compared to present performance management can be adequately handled and analysed, such as the large number of performance management data generated in LTE, for example.

The events and counters are monitored and aggregated for different time periods. In a further example, for specific operational events and counters, different second and further ROPs are set corresponding to time periods related to usage of the mobile telecommunications system. The different second and further ROPs correspond to natural time periods of the human life and behaviour in relation to periods of communication traffic change and traffic load of the telecommunications system, such as five minutes, fifteen minutes, an hour, a day, a week, a month or a year.

The size of the collected events data and counter values may be as large as a few MByte, which does not allow storing them for a long time. The aggregation method makes it possible to store the information in an aggregated way for a longer time. Accordingly, in a further example, the collected events data and counter values are stored for a period of time being a multiple of the respective second and further ROPs. For example, data aggregated for a period of 5 or 15 minutes need only to be stored for a few hours. Data aggregated for 1 hour can be dropped after a few days, etc. It will be appreciated that this is a significant advantage in the efficient use of and the provision of storage capacity.

Processing of the aggregated and further counter values corresponding to the originating nodes, radio access units and ROP comprises, among others, parsing of the aggregated and further counter values and extracting counter values for each counter per cell and node and storing them.

By creating counter value distributions for the extracted counter values, an adequate spatial statistics base is provided serving as reference data for future analysis of the events and counters. The spatial statistics may be created for extracted counter values after filtering thereof with respect to set filter criteria relating to the cells and nodes of the telecommunications system. The filter criteria in fact specify the scope of monitoring and are also used to decrease the amount of data to be processed. Input filtering for (a group of) cells, for example, enables different analysis for rural and urban areas, for example. Counters that are not of interest can be excluded from the analysis using the input filters as well. Filters can be added based on prior knowledge of the system or based on operational experience.

In an example, at least an average value and a standard deviation value of the counter value distributions of the thus created spatial statistics are calculated, among others to identify exceptional counter values. Outlier cells and nodes are identified, for example, by sorting counter values for different cells and nodes. By mapping cause patterns with the identified outlier cells and nodes, system operational performance indicia for the first and second and further ROPs are provided. By correlating the spatial statistics with time-based statistics, more detailed results are derived.

The sensitivity of the OSS is tuned by settable factors f and g, such that outlier cells and nodes are automatically identified if a deviation from the average is larger than f times the standard deviation value and if a number of outlier counters for a same cell is larger than g.

That is, typical error cases can be identified, for monitoring, trouble shooting and optimisation of the mobile telecommunications system. The analysis is performed for different time scales which allows to identify the problems that may be visible in a short or in a long time scale, for example.

Another aspect comprises an Operating Support System, OSS, for providing Performance Management, PM, of a mobile telecommunications system comprising a plurality of nodes and radio access units for servicing a plurality of cells. The nodes and radio access units are arranged for generating a plurality of operational events data and counter values measured periodically for a first Result Output Period, ROP. The OSS comprising:

a collecting unit, arranged for collecting events data and counter values originating from the nodes and radio access units;

an aggregating unit, arranged for aggregating the collected counter values periodically for a second and further ROPs having a duration longer than the first ROP, wherein the first and second and further ROPs are set in relation to a specific operational event and counter;

a counter creating unit, arranged for creating counter values from the collected events data periodically for the second and further ROPs, and a processing and analysing unit, for processing the aggregated and further counter values in relation to the originating nodes, radio access units and ROP, and for analysing the processed counter values for providing system operational performance indicia in different time scales, including the first and second and further ROPs.

The OSS may be comprised by software, hardware or a combination of software and hardware in a single node of a telecommunications system, by a plurality of collaborating nodes and even by a server, gateway or computer processing unit external to the telecommunications system.

In an embodiment, the OSS comprises a unit for setting different second and further ROPs, wherein the aggregating unit and counter creating unit are arranged for operating with set different second and further ROPs.

In a further embodiment, the processing and analysing unit comprises a parser arranged for parsing the aggregated and further counter values for extracting counter values for each counter per cell and node, a storage unit arranged for storing the extracted counter values, a filter unit arranged for filtering extracted counter values with respect to set filter criteria relating to the cells and nodes, and a spatial statistics unit arranged for calculating spatial statistics comprising counter value distributions including an average value and a standard deviation value of the counter value distributions.

For analysing spatial statistics for performance management purposes, in an other embodiment the processing and analysing unit further comprises a sorter unit, arranged for sorting counter values for different cells and nodes and for identifying outlier cells and nodes based on the calculated average value and standard deviation value of the sorted counter values.

The processing and analysing unit may further comprises a mapping unit, arranged for mapping cause patterns with the identified outlier cells and nodes, and a presentation unit for presenting system operational performance indicia based on this mapping.

The above-mentioned and other features and advantages of the invention will be best understood from the following description referring to the attached drawings. In the drawings, like reference numerals denote identical parts or parts performing an identical or comparable function or operation.

DETAILED DESCRIPTION

Figure 1:
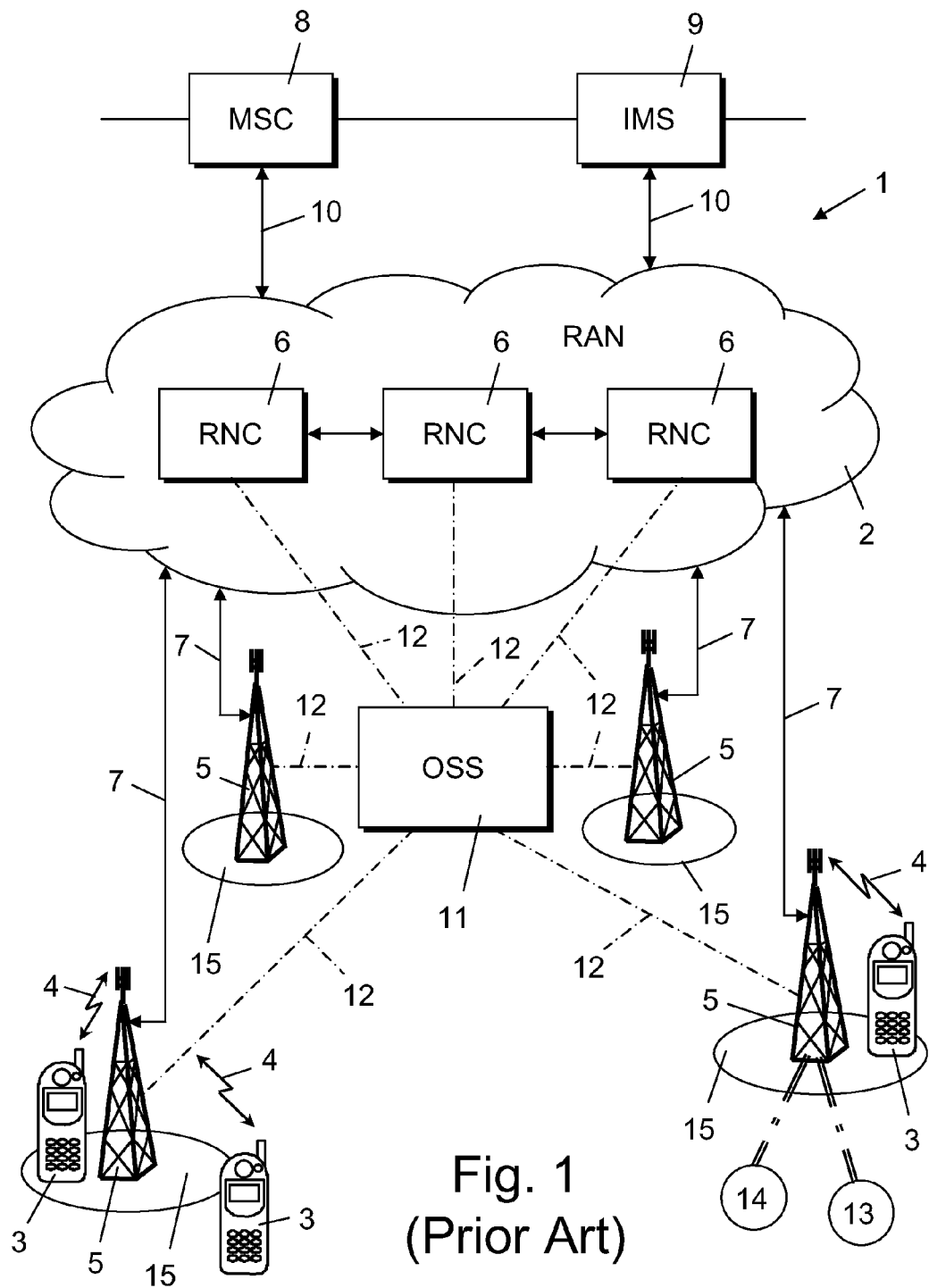
FIG. 1 shows, in a very schematic and illustrative manner, a basic architecture of a mobile telecommunications system comprising an Operating Support System, OSS.

The present invention will now be illustrated by way of example and not by way of limitation in a Radio Access Network, RAN, 2 of a mobile communications system 1, such as a Global System for Mobile communications, GSM, a General Packet Radio Service, GPRS, Wideband Code Division Multiple Access, WCDMA, Time Division-Synchronous Code Division Multiple Access, TD-SCDMA RAN or a Long Term Evolution, LTE, mobile telecommunications system supporting communication with mobile User Equipment, UE, 3 connecting via a wireless radio link 4 and radio access units 5 to the RAN 2. The RAN 2 comprises several node and servers arranged as Radio Network Controller, RNC, 6 for supporting the communication with switching nodes, such as a Mobile switching centre, MSC, 8 and/or servers of an Internet Protocol IP Multimedia Subsystem, IMS, 9 which operatively connect 10 to the RAN 2.

The radio access units 5, called Radio Base Stations, RBSs, in a GSM system, for example, and eNodeBs in an LTE communications system, for example, provide service to UEs 3 in a restricted geographical area, called a cell 15, and connect operatively 7 to the RAN 2 for exchanging calls and data between the different UE 3 and other subscribers and users of the telecommunications system 1.

For the purpose of the present invention, the manner of call handling and data exchange between the several subscribers and users of the telecommunications system is not of importance, such that this will not be further detailed herein. Also because this is knowledge which is fully within the reach of the person skilled in the art.

For the present invention it is important that several radio access units 5 and RNCs 6 of the telecommunications system 1, and in particular the RAN 2, are communicatively connected to a central management or Operating Support System, OSS, 11 of the telecommunications system 1, illustratively indicated by dashed lines 12. The connections 12 may, for example, be streaming connections, for the real-time streaming of events data and counter values to the OSS 11.

In the present description and claims, the radio access units 5 and RNCs 6 are also termed system elements, SEs. The SEs 5, 6 generate internal and external events about their operation. Each event may include one or more parameters that are linked to the event. In the SEs 5, 6 several counters are implemented to obtain aggregate or statistical information of the system. In FIG. 1, these events and counters are schematically indicated by reference numerals 13 and 14, respectively. The counter values are measured by the SEs 5, 6 periodically for a time period, the first Result Output Period, ROP, and the result is stored in ROP files. A basic first ROP is typically 5-15 min and is set corresponding to a specific counter. Note that the RNC nodes 6 may collect and store the events and most of the counters related to the controlled radio access units 5. The ROP files and/or the events from the SEs 5, 6 are forwarded to the OSS 11.

Figure 2:
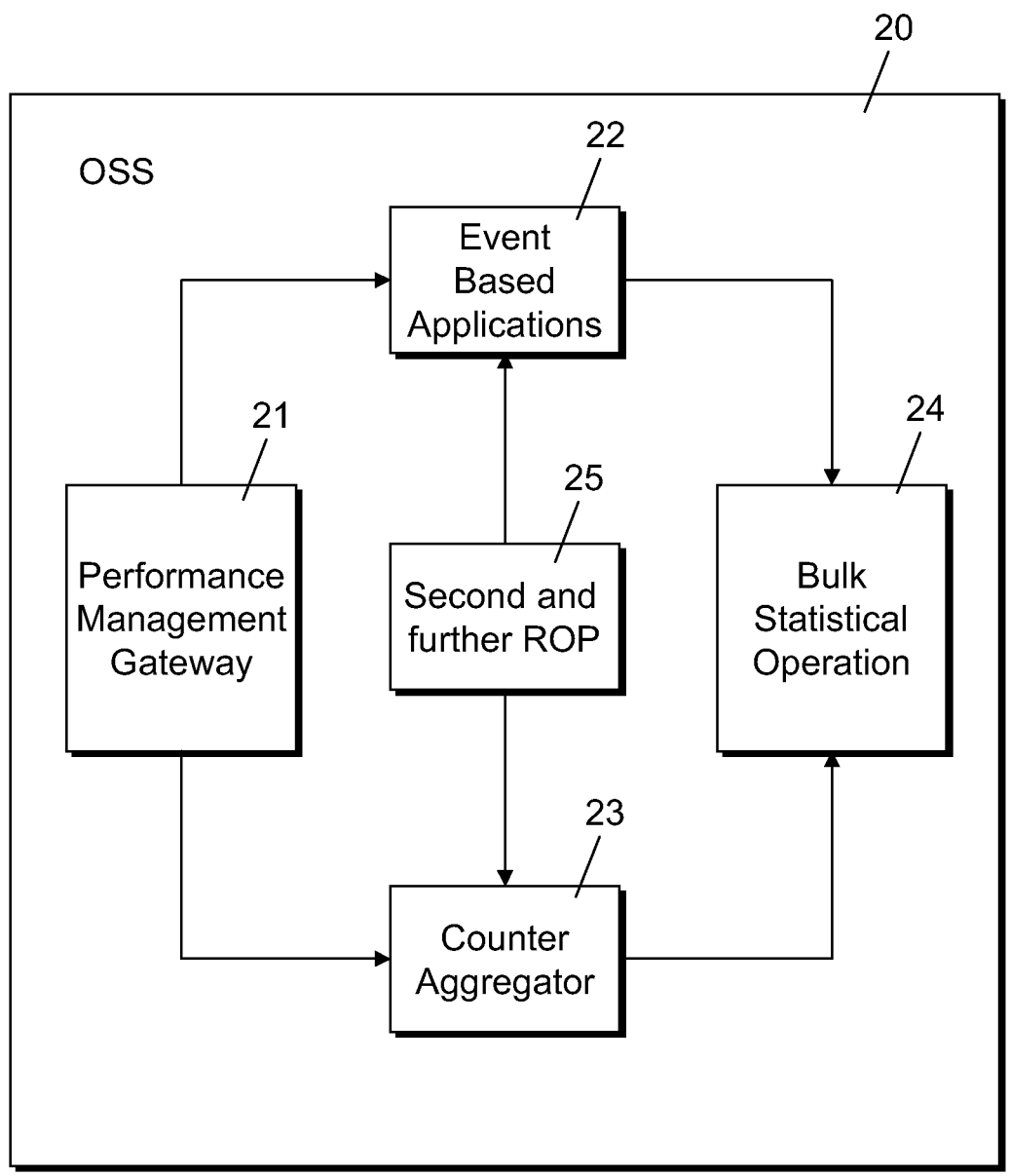
FIG. 2 shows, in a schematic and illustrative manner, an example of an OSS in accordance with the present invention.

FIG. 2 shows schematically an example of an OSS 20 in accordance with the present invention. The OSS 20 includes several Performance Management, PM, functions performed by a data collecting unit, called Performance Management Gateway, PMG, 21, a counter creating unit, called Event Based Applications, EBA, 22, an aggregating unit, called Counter Aggregation, CA, 23 and a processing and analysing unit, called Bulk Statistical Observation, BSO, 24. The OSS 20 further comprises a unit 25 for setting different second and further ROPs, i.e. third, fourth, fifth, etc. ROPs, for use by the EBA 22 and the CA 23.

The events 13 generated by the several radio access units 5 and RNC 6 as shown in FIG. 1 are either forwarded to the PMG 21 or to the other PM functions 22, 23, 24 of the OSS 20.

The counter values 14 and basic first ROP are collected by the PMG 21 and are a primary input of the CA 23. Here the input counter values and ROP files are stored for a time period and periodically aggregated for a second and further ROPs having a duration longer than the first ROP. In the unit 25, the ROP are set in relation to specific operational events and counters. The second and further ROPs are created for natural time periods, which corresponds to the periods of human life and behaviour in relation to the use of the telecommunications system 1, for example ROPs of 1 hour, 1 day, 1 week, 1 month, 1 year. Basic ROPs of 5 or 15 min are, for example, aggregated for 1 hour. The 1 hour ROPs are aggregated for 1 day periods. The 1 day ROPs are aggregated for 1 week periods, etc. It is assumed that these periods correspond to the periodic change of the traffic volume and composition, i.e. speech, multimedia data, internet related data, metering data, etc. The CA 23 provides several ROP files as input to the BSO 24.

The EBA function 22 of the OSS 20 creates counters from the events and parameters included in the events collected by the PMG 21, for the same time periods, i.e. the second and further ROPs as in the CA 23. In the EBA function 22 user defined counters can be specified, that are not implemented in the SEs 6, 7, for example. The EBA function 22 can also be used to define counters or multiple events from different SEs 6, 7. The thus created counter values are input to the BSO 24.

Figure 3:
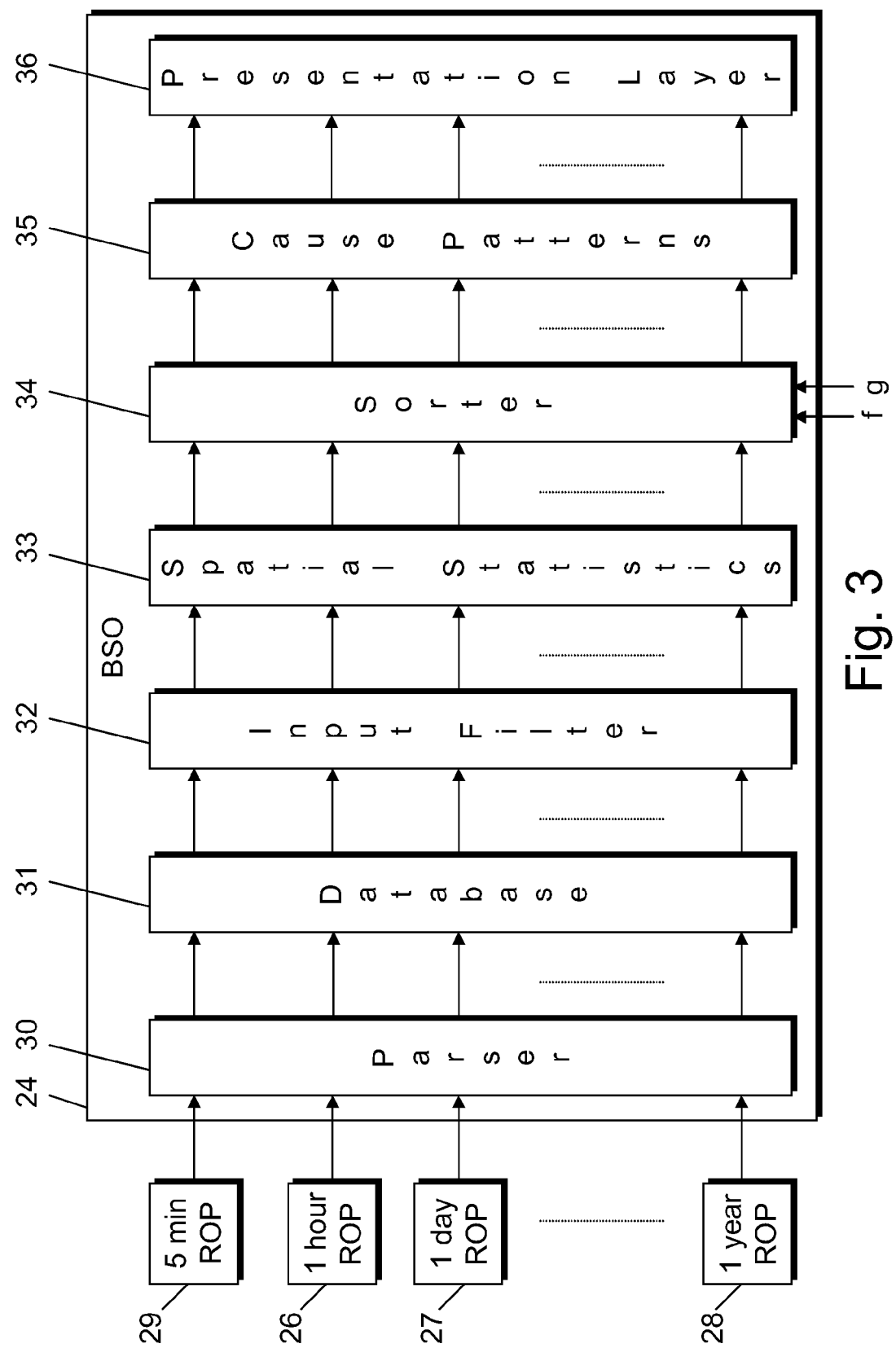
FIG. 3 shows, in a schematic and illustrative manner, an example of the BSO of FIG. 2, in accordance with the present invention.

The BSO operational units and functions are displayed in FIG. 3. BSO 24 receives the first or basic ROP files 29 and the aggregated or second and further ROPs files 26, 27, 28) as input. A parser unit 30 parses the counter files 26, 27, 28, 29 and extracts the counter values for each activated counter per cell 15. The data are stored in a storage unit 31, such as a RAM or a database. The data are stored in the storage unit 31 in order make the data available for historical analysis. This makes it possible, for example, to compare actual collected and processed events and counter data with similar data of previous time periods. Depending on the size of the data and available DB capacity 10-100 ROP files are stored per accumulation periods ROP.

The data are further applied to a filter unit 32, thereby specifying the scope of monitoring and for decreasing the amount of data to be processed. The filtering can be performed for a group or groups of cells 15, to prepare different analysis for rural and urban areas, for example. Counters that are not of interested for a particular analysis should be excluded from such analysis for which the filter unit 32 can be applied as well. By default all cells and parameters are included. Filters can be added based on prior knowledge of the system or based on operation experience, for example.

For each counter that passes the filter unit 32, spatial statistics are created by a spatial statistics unit 33, which means that a statistical distribution of the counter values is created for the cells 15, or SEs 5, 6. From these statistics, the average and standard deviation are calculated for the different time scales, i.e. the first and second and further ROPs. Other quantities that characterize the distribution may also be obtained.

The counter values for the different cells are sorted per counter and outlier cells are identified by a sorter unit 34. The counter value is an outlier, for example, if the deviation from the average is larger than a factor f times the standard deviation value, where f=3 or another value to be set. Accordingly the value of f is used to control the number of outliers.

Another factor g to be set is the number of outlier counters for the same cell. For example, if the value of g>5 there are more than 5 parameters that have an extraordinary value and they should belong to the same root cause or root causes.

The parameters f and g are used to tune the sensitivity of the OSS system 20. The actual values of the factors f and g may depend from the type and size of the mobile telecommunications system and/or the operator, for example.

Next, cause patterns are fitted to the outlying counters by a mapping unit 35, which helps the operator to identify the problem and the root cause of the problem. If, for example, call drop or data packet loss for a certain service is high in a particular cell 15 and at the same time the signal strength level is relatively low, it can be concluded that the drop or loss is due to the week signal. Predefined cause patters can be provided with the mapping function, however the mapping function and unit 35 provide the possibility to add new patterns by the operator based on operation experience.

The analysis is done for different time scales, that is different ROP, as illustrated by the several rows of arrows corresponding to a particular ROP file 26, 27, 28, 29. This makes it possible to observe different types of problems. A problem may be identified only at smaller time scale. On the other hand in short time scale there can be many outliers that make it difficult to identify the problem. Long scale observation may identify problems that are due to long time traffic increase, aging of connectors, devices, etc, that are not visible in short time scale. This makes it possible to investigate the history of the values of different parameters.

This analysis assumes that the majority of the cells and SEs operate well. This is also a necessary criterion for a self configuration system like LTE, where automating functions ensure the proper settings and operation. The results may be presented in different ways. For each time scale the cells that have outlying counters are presented and listed. In another view the relevant counters can be selected, or they are selected automatically as the counters having outlying values and the corresponding cells are indicated. These performance indicia are presented by the presentation unit 36 of the processing and analysing unit 24.

Figure 4:
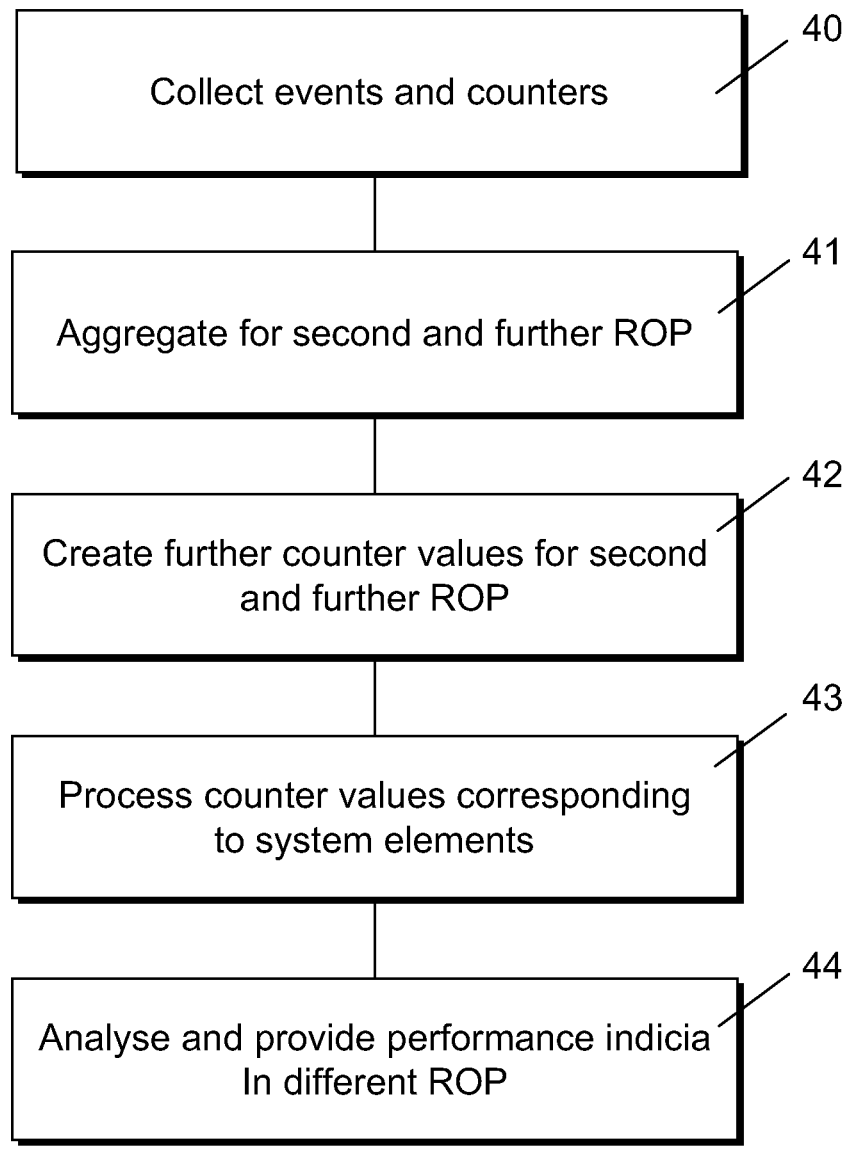
FIG. 4 illustrates an example of the method according to the invention.

FIG. 4 illustrates in a flow chart type diagram the steps of an example of performing the method of the invention, with reference to the a telecommunications system as outlined by FIG. 1 and measured periodically for a first Result Output Period, ROP.

In a first step 40, collecting events data and counter values originating from said nodes 6 and radio access units 5 are collected. In a second step 41, the collected counter values are periodically aggregated for a second and further ROPs having a duration longer than the first ROP, wherein the first and second and further ROPs are set corresponding to a specific operational event and counter. In a further step 42 counter values are created periodically for the second and further ROPs from the collected 40 events data. By processing the aggregated and further counter values in step 43 corresponding to the originating nodes 6, radio access units 5 and ROP, and analysing 44 the processed counter values, system operational performance indicia in different time scales are provided 44.

Further examples of the method are elucidated above with reference to the FIGS. 2 and 3.

With the present invention an operator becomes a good overview of the system and network operation, which includes all available counters. It can be used for automatic monitoring and trouble-shooting as well. It provides a centralized performance monitoring method, i.e. an operators can avoid complex drive tests, etc. in order to obtain a full picture of the system operation. The method and OSS system provided are able to monitor all available counters in a mobile communications system, as well as user defined counters.

The invention makes use of the self consistency of data instead of predefined thresholds and is self-adapting to different system deployment scenarios, traffic conditions, etc. There is no not need for specific system or network knowledge to use the present performance management tool. On the other hand it has the flexibility to add such knowledge to processing and analysing unit BSO 24, for example, if required.

The result is analyzed in different time scales therefore it is possible to notice errors that occur slowly, e.g. due to oxidation of connectors, as well as short temporary problems like large traffic bursts, packet delays, variations in packet delays, etc.

The present invention is not limited to the embodiments as disclosed above, and can be modified and enhanced by those skilled in the art beyond the scope of the present invention as disclosed in the appended claims without having to apply inventive skills.

The invention claimed is:

1. A method of system performance management by an Operating Support System (OSS) of a mobile telecommunications system, the mobile telecommunications system comprising a plurality of nodes and radio access units servicing a plurality of cells generating a plurality of operational events data and counter values measured periodically for a first Result Output Period (ROP) the method comprising:
   collecting events data and counter values originating from the nodes and radio access units, the events data corresponding to events;
   aggregating the collected counter values periodically for a second and further ROPs having a duration longer than the first ROP, wherein the first and second and further ROPs are set corresponding to a specific operational event and counter;

creating further counter values from the collected events data periodically for the second and further ROPs;
processing the aggregated and further counter values corresponding to the originating nodes, radio access units, and ROP, the processing comprising:
parsing the aggregated and further counter values to extract counter values for each counter per cell and node;
storing the extracted counter values;
analyzing the processed counter values for providing system operational performance indicia in different time scales.

2. The method of claim 1 wherein the specific operational events and counters the second and further ROPs are set corresponding to correspond to time periods related to usage of the mobile telecommunications system.

3. The method of claim 1 further comprising storing the collected events data and counter values for a period of time being a multiple of the respective second and further ROPs.

4. The method of claim 1:
wherein the events include parameters;
wherein the creating further counter values comprises creating further counter values for different parameters of an event.

5. The method of claim 1 further comprising creating spatial statistics comprising counter value distributions based on the extracted counter values.

6. The method of claim 5 further comprising filtering the extracted counter values with respect to set filter criteria relating to the cells and nodes, prior to the creating spatial statistics.

7. The method of claim 5 further comprising:
calculating an average value and a standard deviation value of the counter value distributions from the spatial statistics;
sorting counter values for different cells and nodes;
identifying outlier cells and nodes based on the calculated average value and standard deviation value of the sorted counter values.

8. The method of claim 7:
wherein the identifying outlier cells and nodes comprises identifying outlier cells and nodes as those having both:
a deviation from the average is larger than a factor f times the standard deviation value; and
a number of outlier counters for a same cell is larger than a factor g;
wherein values of f and g are settable for tuning sensitivity of the OSS.

9. The method of claim 7 wherein the analyzing comprises mapping cause patterns with the identified outlier cells and nodes, for providing the system operational performance indicia for the first and second and further ROPs.

10. An Operating Support System (OSS) for providing performance management of a mobile telecommunications system, the mobile telecommunications system comprising a plurality of nodes and radio access units for servicing a plurality of cells and arranged for generating a plurality of operational events data and counter values measured periodically for a first Result Output Period (ROP), the OSS comprising:
a collecting circuit configured to collect events data and counter values originating from the nodes and radio access units;
an aggregating circuit configured to aggregate the collected counter values periodically for a second and further ROPs having a duration longer than the first ROP, wherein the first and second and further ROPs are set in relation to a specific operational event and counter;
a counter creating circuit configured to create counter values from the collected events data periodically for the second and further ROPs;
a processing circuit configured to:
process the aggregated and further counter values in relation to the originating nodes, radio access units, and ROP;
analyze the processed counter values for providing system operational performance indicia in different time scales, including the first and second and further ROPs;
wherein the processing circuit comprises:
a parser configured to parse the aggregated and further counter values to extract counter values for each counter per cell and node;
a storage circuit configured to store the extracted counter values.

11. The OSS of claim 10 further comprising a setting circuit configured to set the different second and further ROPs; wherein the aggregating circuit and counter creating circuit are arranged for operating with set different second and further ROPs.

12. The OSS of claim 10 wherein the processing circuit comprises:
a filter circuit configured to filter extracted counter values with respect to set filter criteria relating to the cells and nodes;
a spatial statistics circuit configured to calculate spatial statistics comprising counter value distributions including an average value and a standard deviation value of the counter value distributions.

13. The OSS of claim 12 wherein the processing circuit further comprises a sorter circuit configured to:
sort counter values for different cells and nodes;
identifying outlier cells and nodes based on the calculated average value and standard deviation value of the sorted counter values.

14. The OSS of claim 13 wherein the processing circuit further comprises:
a mapping circuit configured to map cause patterns with the identified outlier cells and nodes;
a presentation circuit configured to present system operational performance indicia based on the mapping.

* * * * *